United States Patent [19]

Graf

[11] Patent Number: 5,360,084
[45] Date of Patent: Nov. 1, 1994

[54] APPARATUS FOR THE LUBRICATION AND CLEANING OF ELONGATED ARTICLES, ESPECIALLY RAILS AND CHAINS

[75] Inventor: Walter Graf, Euerdorf, Germany

[73] Assignee: Satzinger GmbH & Co., Euerdorf, Germany

[21] Appl. No.: 155,117

[22] Filed: Nov. 19, 1993

[30] Foreign Application Priority Data

Nov. 27, 1992 [DE] Germany ............... 4239839

[51] Int. Cl.⁵ ............................... B61K 3/00
[52] U.S. Cl. .................... 184/3.2; 184/15.1; 184/15.2; 184/15.3; 15/256.5; 474/91; 474/92
[58] Field of Search ............. 184/3.2, 3.1, 15.1, 184/15.2, 15.3, 16; 15/256.5; 474/91, 92

[56] References Cited
U.S. PATENT DOCUMENTS 3,823,797  7/1974  Ducatillon .
3,903,994  9/1975  Hafner ..................... 184/15.2
4,891,037  1/1990  Maples .................... 184/15.1
5,020,637  6/1991  Hoenselaar .
5,213,180  5/1993  Masonek et al. .......... 184/15.1

FOREIGN PATENT DOCUMENTS 360213   9/1922  Germany .................. 184/15.2
99962    5/1925  Germany .................. 184/15.1
3811469 10/1989  Germany .
89480   10/1921  Switzerland ............... 184/3.2

Primary Examiner—Thomas E. Denion
Attorney, Agent, or Firm—Herbert Dubno

[57] ABSTRACT

A lubricating and cleaning unit for chains and rails has a pair of parallel shanks of a shoe and a crosspiece receiving a U-shaped brush in a groove which distributes lubricant through bores in the shanks and crosspiece of the brush to respective bristle bundles. One or more automatic feeders can be connected to threaded openings of the lubricant-distribution bores opening along the sides of the body. The unused openings are closed by plugs.

9 Claims, 4 Drawing Sheets

APPARATUS FOR THE LUBRICATION AND CLEANING OF ELONGATED ARTICLES, ESPECIALLY RAILS AND CHAINS

FIELD OF THE INVENTION

My present invention relates to an apparatus for the lubrication and cleaning of elongated articles, especially rails and chains and, more particularly, to an apparatus which either moves along a rail, e.g. as part of a vehicle, for cleaning that rail and lubricating it, e.g. as in the case with rail-borne vehicles such as trains, or for the cleaning and lubricating of a chain in, for example, a chain-driven vehicle such as a motorcycle.

BACKGROUND OF THE INVENTION

Apparatus for the lubricating and cleaning of elongated articles is known in a variety of forms and generally utilizes a lubricating shoe which can straddle the rail or chain and has brushes which bear against the rail or chain so that, upon relative movement of the article and the lubricating shoe, e.g. by drawing the chain through the shoe or by moving the shoe along the rail, the brushes can clean contaminants from the article and apply a substantially uniform coating of the lubricant to the article.

The shoe is usually associated with a lubricant feeder which can be controlled to provide a certain amount of the lubricant upon the article.

One prior art device of this type is disclosed in U.S. Pat. No. 5,020,637 and comprises a cylindrical lubricating shoe from which the brushes project at angles of 120° to one another and one side of the cylinder wall of which is open to allow the vehicle chain, e.g. of a bicycle or motorcycle, to be inserted into the cylindrical housing.

The brushes are carried by respective bodies which can be slid into grooves of the cylindrical carrier. A single bore is provided in one of these brush bodies for delivering the lubricant to it via a long pipe from the head of a gas-pressurized lubricant container. The device must be manually operated and because of its construction cannot assure a uniform distribution of the lubricant on all sides of the chain.

Since the lubricant supply utilizes a relatively small opening, distribution is a problem, especially since the lubricating device is relatively short. The lubricant feed tends to be stopped up. The cost of the unit is considerable and its manipulation requires a certain degree of dexterity. The dismounting of the brushes is problemmatical and cleaning of the device is likewise a problem and is time consuming.

Another apparatus for applying a material to an elongated member is described in U.S. Pat. No. 3,823,797 which uses a ring-shaped shoe open at one side for the lubrication of cables. While the lubricant is applied from one side to a multiplicity of orifices, the uniform distribution of the lubricant remains problemmatical. A circular array of brushes may be employed here or the brushes can be provided on two shanks which form a V with one another, i.e. are divergent from one another. In this system dismounting for replacement of the brush units is not provided for and may not be possible. The application of the lubricant takes place over a very small length cable and hence uniform lubrication of an elongated body cannot be assured.

OBJECTS OF THE INVENTION

It is the principal object of the present invention to provide an improved apparatus for the lubrication and cleaning of elongated articles, especially rails and chains, whereby drawbacks of earlier systems as detailed above can be obviated.

Another object of the invention is to provide an apparatus which ensures effective and uniform lubrication of a chain or rail and, moreover, an effective and intensive cleaning thereof.

It is still another object of the invention to provide an apparatus which can be matched in a relatively simple way to the lubricating and cleaning needs, can be operated with a minimum of handwork, and which can itself be cleaned readily and can enable replacement of the brushes.

SUMMARY OF THE INVENTION

These objects and others which will become apparent hereinafter are attained, in accordance with the invention, in an apparatus for the lubrication and cleaning of elongated articles and especially chains and rails which can have a plurality of identical shoe modules each with a pair of parallel module shanks and a module bridgepiece connecting these shanks and perpendicular thereto.

The shanks and bridgepiece can define receiving grooves along their inner sides, into which can be set the brushes in the form of respective brush modules.

Thus the invention provides a corresponding number of brush modules each with two brush shanks and a brush bridgepiece. At their rear sides, the brush modules can engage in the complementary receiving grooves and can be edge-sealed relative to the bodies of the shoe modules so that spaces can be provided between the floor of each groove and the back of the brush module, either by recesses formed in the one or the other or simply by a spacing between the two.

Brush bundles are set into the inner sides of the brush module and extend inwardly to engage the rail or chain straddled by the apparatus. Distribution passages are formed in the shoe modules for delivering the lubricant to the aforementioned spaces and the brush module is formed with a multiplicity of bores along each shank and along the bridgepiece for communicating the spaces and the brish bristol bundles to deliver the lubricant to the bristles.

An automatic lubricant feeder is connected to the lubricant distribution passages.

In the mounted state of the brush module in the respective shoe module, the lubricant distribution passages, the lubricant feed bores or openings and the automatic lubricant feeder form a closed hydraulic system which is open to the exterior only through the lubricant bores feeding the lubricant to the bristle bundles.

The plurality of shoe modules are arranged one behind the other, i.e. module shank ahead of module shank and bridge-piece ahead of bridgepiece, and are combined in this manner into the apparatus as will be described in greater detail hereinafter.

The module shanks and the module bridgepiece have substantially a U configuration and preferably the module shanks and bridgepiece are in the form of three sides of a rectangle. Correspondingly, the receiving grooves and the brush module which is fitted therein can be of generally rectangular configuration.

Advantageously a detent system is provided for indexing the brush modules in the receiving group.

In a preferred embodiment of the invention, the body of the shoe module is equipped with threaded openings each of which is adapted to receive a respective automatic lubricant feeder or a threaded plug to close off that opening, each threaded opening communicating with a respective passage communicating with the brushes of the respective shank or bridgepiece.

Instead of two or more lubricant feeders, a single lubricant feeder can be provided with the excess openings closed off by respective plugs.

The lubricant feeder is preferably a gas-driven lubricant feeder of the type described in German Patent document DE-OS 38 11 469 in which, by electrolytic action, a gas is generated to pressurize the flowable lubricant medium to drive it out of the single outlet of this feeder.

According to the invention, a multiplicity of lubricant bores supplies the lubricant to the bristle bundles of each shank and bridgepiece.

In any event, the dimensioning, arrangement and number of the lubricant bores in the backs of the brushes is so selected that the lubricant supply meets the desired requirements at each location. This applies as well to the distribution passages in the shoe module.

The lubrication system of the invention has been found to be highly effective for a uniform, controlled and sufficient lubrication of the chain or rail.

The passages of the shoes which are to be used simply for cleaning and not to feed lubricant to the article can be closed off by respective plugs. The lubricant is supplied practically from all sides and uniformly to the article to be lubricated with the brushes simultaneously removing contaminants. The brush modules can be simply pulled out of the respective grooves and replaced or cleaned. The number of shoe modules to be assembled into the apparatus can be adjusted to suit the lubricating and cleaning needs for substantially any article, and, for example, two or more lubricating shoes can be associated with any number of cleaning shoes. The bristle bundle arrangement, bristle lengths and the bundle hardness can be selected for any particular requirement and handling is minimal.

In a preferred embodiment of the invention, the shoe modules have planar abutment faces on opposite sides as they lie against the corresponding planar surfaces of adjoining modules and are secured together in module stacks.

Of course the module assembly should be such that it does not create any problems for affixing the desired number of lubricant feeders to those modules which are to act as lubricating modules.

In a particularly preferred embodiment, three shoe modules are disposed in a row in a module stack, with only the middle shoe module serving as a lubricating module while the two outer shoe modules, which sandwich the lubricating module between them, serve as cleaning and lubricant-spreading modules.

The invention is, of course, not limited to arrangements of shoe modules one behind the other and two or more shoe modules can be provided side by side when, for example, parallel rails or chains are to be lubricated and cleaned.

According to a feature of the invention, fastening devices are provided for the connection of the shoe modules to one another and to a drive device for movement of the apparatus along a rail to be lubricated, for example, or for mounting the apparatus at a stationary location along which a chain can be moved. Such fastening devices can include bores traversing the shoes in a longitudinal direction or blind bores opening laterally into the body.

The shoe modules and brush modules can be fabricated from different materials. Preferably the shoe module is a diecast body of metal or an injection-molded body of plastic.

It has been found to be advantageous to fabricate the body of the brush module, including the brush bridgepiece and the brush shanks as a one-piece linear extruded synthetic resin body and to form two cutouts therein which are mitered so that the mitered surfaces fit against one another when the extruded body is folded at corners to fit into the curve of the respective shoe module. The bristle bundles can be composed of any desired and suitable material, although preferred are nylon filaments or horsehair. The entire apparatus or the individual shoe and brush modules thereof can be dimensioned, of course, to suit the lubricating and cleaning requirements.

More particularly, an apparatus for lubrication and cleaning of the elongated article can comprise:

a plurality of identical shoe modules joined together in an assembly and aligned with one another, each of the shoe modules comprising:

a body formed with a shoe bridgepiece and a pair of shoe shanks, brush-receiving grooves formed along inner sides of the shank and the bridgepiece, and lubricant-distribution passages formed in the body and communicating with the grooves;

a respective brush module received in each of the shoe modules, each brush module comprising:

a pair of brush shanks shaped and dimensioned to fit into the grooves of respective shoe shanks and a brush bridgepiece connecting the brush shanks and shaped and dimensioned to fit into a respective groove of the respective shoe bridgepiece, the brush module sealingly engaging the respective body along edges of the respective grooves whereby floors of the grooves and backs of the brush module define spaces communicating with the passages, respective bundles of bristles on the brush shanks and the brush bridgepiece and extending inwardly to engage the article with the shanks of the shoe and brush modules straddling same, and lubricant bores formed in the brush shanks and the brush bridgepiece and communicating with the distribution passages through the spaces for delivering the lubricant to the bristles; and at least one automatic lubricant feeder connected to the passages of at least one of the shoe modules for feeding the lubricant to the passages thereof, the lubricant feeder, the passages of the one of the shoe modules, the spaces of the one of the shoe modules and the bores of the brush module of the one of the shoe modules forming a closed hydraulic system opening to the exterior only at the bores feeding the lubricant to the bristles.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
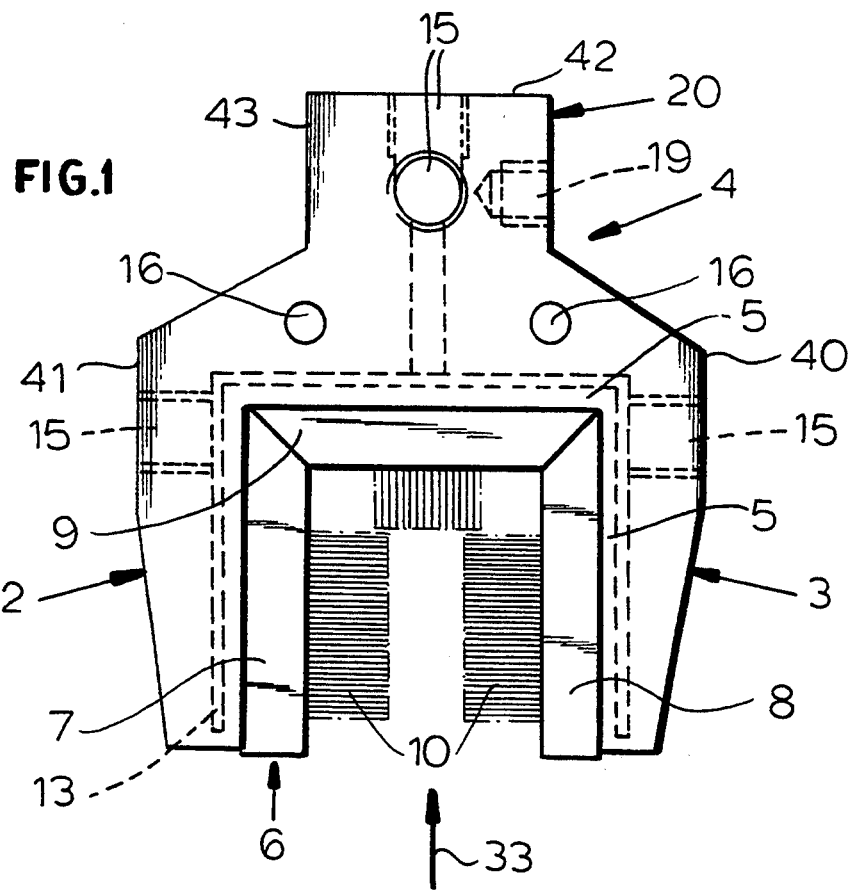
FIG. 1 is an elevational view of a shoe module of an apparatus of the invention, in which a brush module is received.
Figures 2, 4:
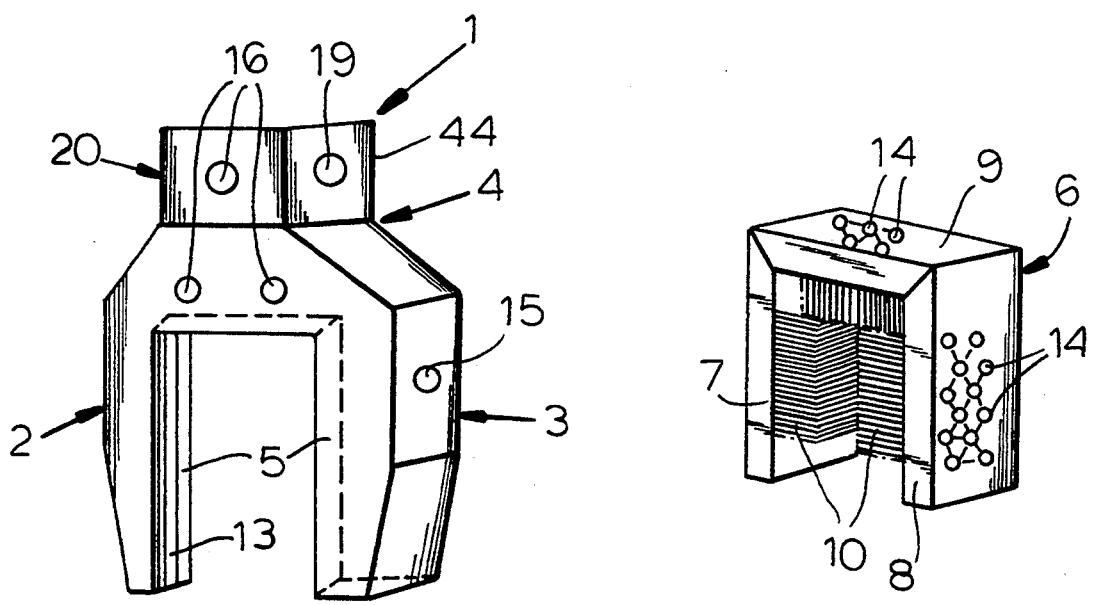
FIG. 2 is a perspective view of the shoe module of the invention in a somewhat diagrammatic form.
FIG. 4 is a perspective view of the brush module which can be fitted into that shoe module.
Figure 5:
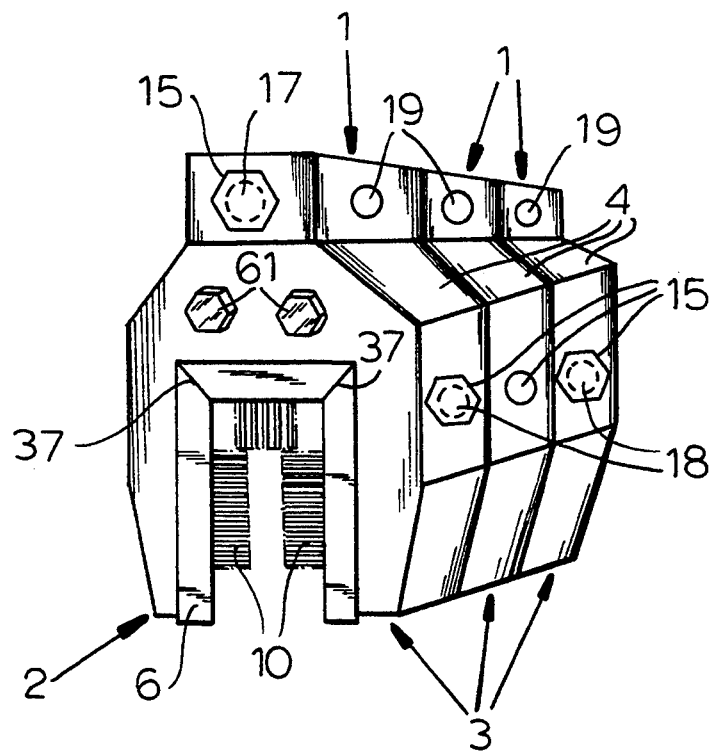
FIG. 5 is a perspective view of a stack of modules forming the apparatus of the invention.

The apparatus shown in the drawing for lubricating and cleaning chains and rails has been shown in the perspective view of FIG. 5 to comprise a number of identical shoe modules 1 which have been shown in greater detail in FIGS. 1 and 2. Each module 1 is comprised of a die-cast metal or injected-molded plastic body and has two module shanks 2, 3 and a bridgepiece 4 formed internally with receiving grooves 5 for the insertion of the brush module 6.

The brush module 6 is fabricated from a one-piece extrusion as will be described with respect to FIG. 3, folded into a rectangular configuration as shown in FIG. 4 to fit into the grooves 5 within the opening provided by the shanks and cross-piece of the shoe module.

More particularly, the brush module 6 has a pair of brush shanks 7, 8 and a crosspiece 9.

Figure 3:
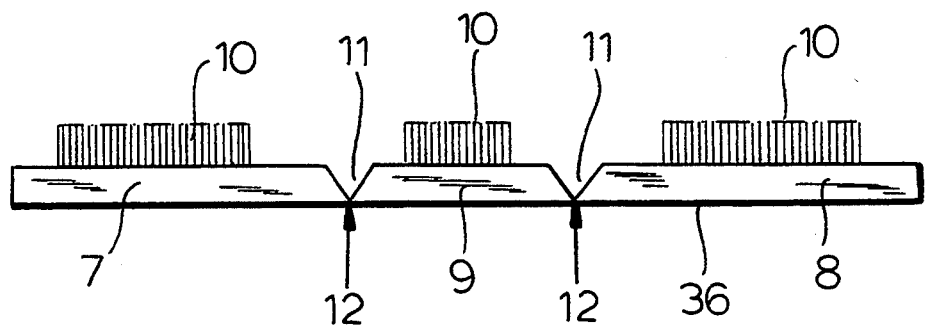
FIG. 3 is a side view showing the linear extrusion with its cutouts used to form a brush module.
Figure 6:
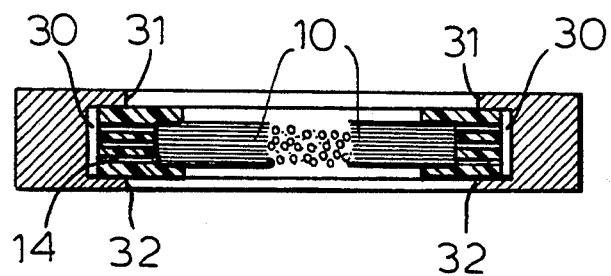
FIG. 6 is a cross sectional view through the brush module looking toward the bridgepiece thereof.

FIGS. 1, 3 and 4 show that the brush shanks 7, 8 and the brush bridgepiece 9 each have a bar-like configuration in which respective bristle bundles 10 can be lodged. The brush module 6 is so fitted into the grooves 5, as FIGS. 1 and 5 show, that a seal is provided around the edges of spaces 30 formed between the back of the brush module and the floor of the grooves 5 which can be peripherally or edge-sealed at 31 and 32, for example, so that the only flow of lubricant will be through the bores 14 of the bristle bundles 10 (see FIG. 6).

In a preferred embodiment of the invention and in the embodiment illustrated, the receiving grooves 5 of the shoe module 1 and the brush shank, 8 and bridgepiece 9 of the brush module 6 are in the form of three sides of a rectangle. In this manner a problem-free insertion of the brush module in the direction of the arrow 33 (FIG. 1) is possible.

Figure 7:
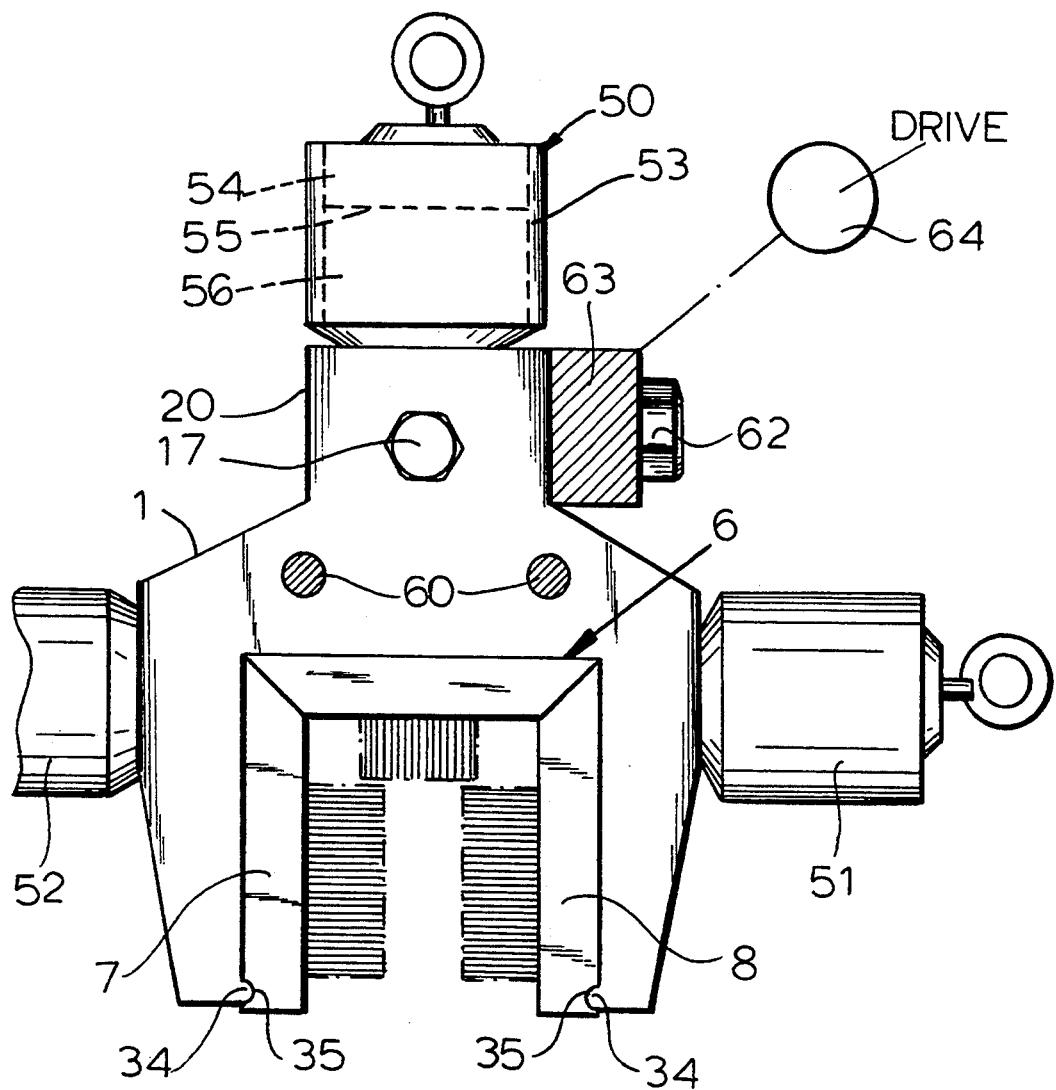
FIG. 7 is a view similar to FIG. 1 showing an apparatus in which a number of automatic feeders is provided for the lubricating module.

As can be seen from FIG. 7 as well, on the brush module, projections 34 can be provided to engage in recesses 35 formed in the shanks 7 and 8 of a brush module 6 to form a detent system for indexing the brush module in the respective shoe module 1.

In a preferred embodiment of the invention, the brush module 6 can be formed by extruding a continuous body 36, e.g. of nylon, and forming two mitered cutouts 11 in this extruded body so that a plastic hinge is formed at 12 at the vertex of the two miters for each cutout.

The shanks 7 and 8 can then be folded at right angles to the bridgepiece 9 about the flexible hinges 12 with the mitered surfaces engaging one another for formation of joints 37 as the brush is inserted into the shoe module. The connection 12 between the parts folded together must be very thin and sufficiently deformable to allow the bending or folding of the extruded body in the manner described.

As floors of the grooves 5 have lubricant distribution passages 13 opening at them, these distribution passages being shown in broken lines in FIG. 1 and communicating with threaded openings 15 in the lateral surfaces 40 and 41 of the shoe module body, in an upper surface 42 thereof and in one or both of the planar surfaces 43 and 44 at which the modules can abut one another.

Each of the brush shanks 7, 8 and the bridgepiece 9 is formed with a multiplicity of lubricant bores 14 so that the lubricant can be uniformly distributed to the bristle bundles 10 in a sufficient quantity.

As can be seen from FIG. 7, some of the threaded openings may be closed by threaded plugs 17 and 18 while others can receive automatic lubricant feeders 50, 51 and 52, three of which have been shown in FIG. 7 communicating with a single lubricating shoe. Each of the automatic feeders may be of the type described in DE-OS 38 11 469, i.e. may be a cylindrical vessel 53 provided with a chamber 54 in which gas is generated electrolytically to displace a piston 55 toward an outlet and drive a body 56 of the flowable medium forming the lubricant gradually toward that outlet. For a given lubricating shoe, in the mounted state of the respective brush module 6, the lubricant-distributing passages 13, the lubricant-supply opening 15 and the automatic lubricant feeder or feeders form a closed hydraulic system which opens to the exterior only through the lubricant bores 14 feeding the lubricant to the bristle bundles 10.

As will be apparent from FIGS. 5 and 7, a lubricating module 1, with which the lubricant feeder can be provided, can be mounted in a module stack with other modules 1 serving only for cleaning and lubricant distribution and the openings 15 which are closed by the threaded plug 17 and 18. In the embodiment shown in FIG. 5, only the middle shoe module serves as a lubricant module and the end modules form cleaning and distribution modules.

The modules of the stack are held together by drawbolts 60 (FIG. 7), heads of which have been shown at 61 in FIG. 5.

The shoe modules can also be provided with threaded blind bores 19 in the cubic formations 20 projecting upwardly from the bridgepieces 4 for fastening the modules to a stationary structure or providing the stack of modules with a drive. For example, as shown in FIG. 7, screws 62 can attach a bar 63 to the modules of the stack, the bar being connected to the drive 64 which can displace the assembly along a rail.

In the projection 20, the threaded openings 15 can be parallel to and perpendicular to the bores 16 so that a supply of the lubricant from different directions can be assured.

Figure 8:
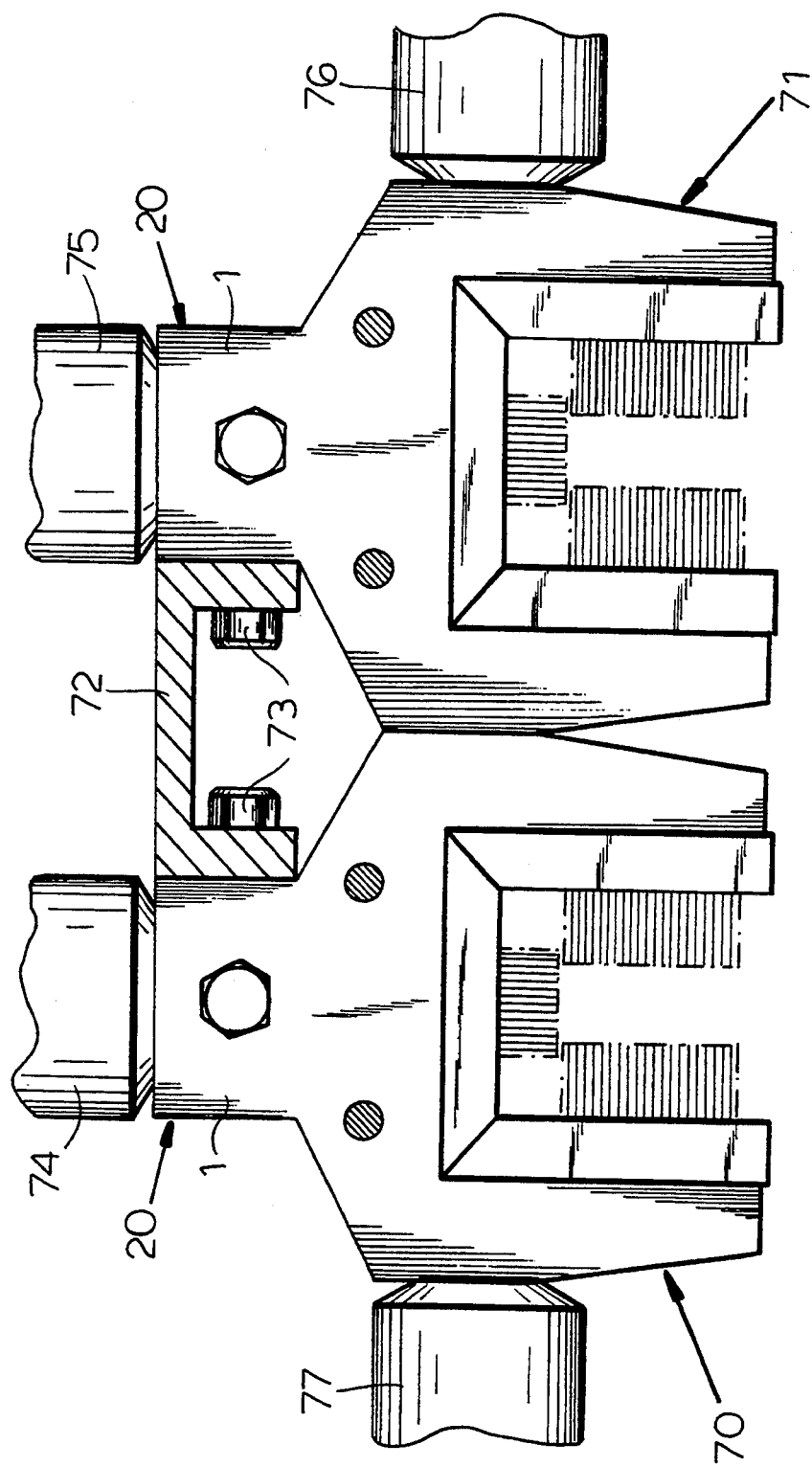
FIG. 8 is a view similar to FIG. 7 showing a system in which modules are provided side by side.

In FIG. 8 I have shown an embodiment wherein two stacks 70 and 71 of the shoes 1 are provided side by side, being held by a bracket 72 whose screws 73 are fitted into respective blind bores 19 of the projections 20 of the corresponding lubricant shoes. The automatic feeders are here represented at 74, 75, 76 and 77 and otherwise the construction of the units is similar to that previously described. This embodiment serves for the lubrication and cleaning of two parallel chains which are straddled by one of the stacks of shoes.

I claim:

1. An apparatus for the lubrication and cleaning of an elongated article which are relatively movable, said apparatus comprising:
   a plurality of identical shoe modules joined together in an assembly and aligned with one another, each of said shoe modules comprising:
   a body formed with a shoe bridgepiece and a pair of shoe shanks,
   brush-receiving grooves formed along inner sides of said shank and said bridgepiece, and
   lubricant-distribution passages formed in said body and communicating with said grooves;
   a respective brush module received in each of said shoe modules, each brush module comprising:
   a pair of brush shanks shaped and dimensioned to fit into the grooves of respective shoe shanks and a brush bridgepiece connecting said brush shanks and shaped and dimensioned to fit into a respective groove of the respective shoe bridgepiece, said brush module sealingly engaging the respective body along edges of the respective grooves whereby floors of said grooves and backs of said brush module define spaces communicating with said passages,
   respective bundles of bristles on said brush shanks and said brush bridgepiece and extending inwardly to engage said article with the shanks of said shoe and brush modules straddling same, and
   lubricant bores formed in said brush shanks and said brush bridgepiece and communicating with said distribution passages through said spaces for delivering said lubricant to said bristles; and
   at least one automatic lubricant feeder connected to the passages of at least one of said shoe modules for feeding said lubricant to the passages thereof, said lubricant feeder, the passages of said one of said shoe modules, said spaces of said one of said shoe modules and the bores of the brush module of said one of said shoe modules forming a closed hydraulic system opening to the exterior only at the bores feeding the lubricant to the bristles.

2. The apparatus defined in claim 1, further comprising threaded plugs screwed into the body of at least one of said shoe modules to close off the passages thereof and provide a cleaning module therefrom.

3. The apparatus defined in claim 1 wherein said one of said shoe modules has a plurality of threaded openings at which the passages thereof open at surfaces of said body, said automatic lubricant feeder being connected to said body at one of said threaded openings, a threaded plug being screwed into another of said threaded openings.

4. The apparatus defined in claim 1, wherein each of said shoe modules has planar opposite faces and the shoe modules are joined together at said faces with at least one of said shoe modules forming a lubricant module and at least one other of said shoe modules forming a nonlubricating cleaning module.

5. The apparatus defined in claim 4 wherein said lubricating module is sandwiched between two cleaning modules.

6. The apparatus defined in claim 1 wherein said automatic feeder is a gas-pressurized vessel containing said lubricant.

7. The apparatus defined in claim 1 wherein each of said bodies has the shape of a Y with parallel shanks.

8. The apparatus defined in claim 1 wherein each of said bodies is an injection-molded part of synthetic resin or a die-cast part of metal.

9. The apparatus defined in claim 1 wherein each of said brush modules has a one-piece extruded body formed with cutouts defining adjoining miters at corners formed by bending said extruded body at said cutouts upon fitting of said brush module into the grooves of the body of said one of said shoe modules.

* * * * *